United States Patent Office 3,851,025
Patented Nov. 26, 1974

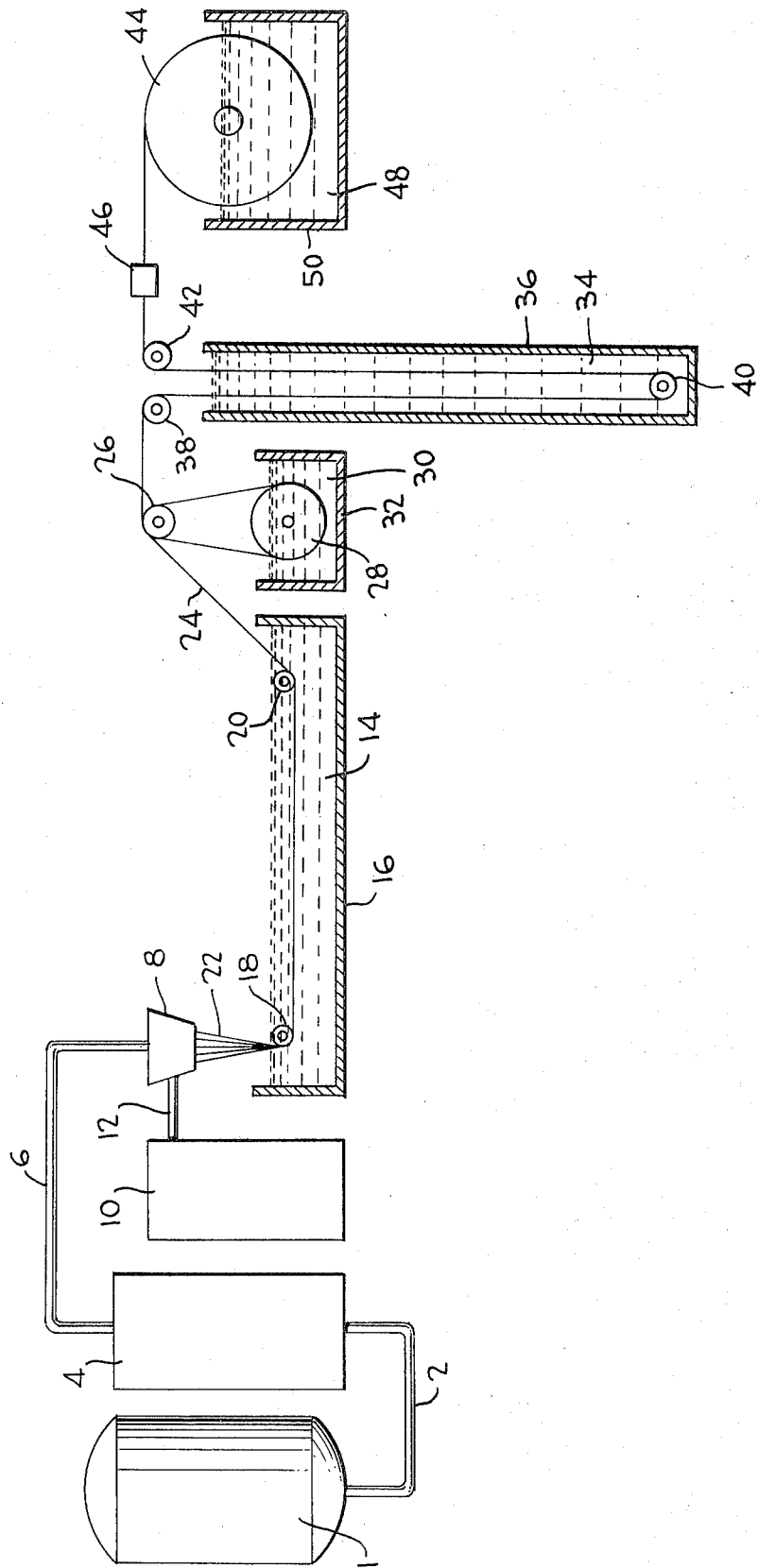

3,851,025
PROCESS FOR FORMING HOLLOW POLYBENZ-
IMIDAZOLE FILAMENTS FOR REVERSE
OSMOSIS APPLICATIONS
Michael J. Ram, West Orange, N.J., assignor to
Celanese Corporation, New York, N.Y.
Filed Jan. 22, 1973, Ser. No. 325,779
Int. Cl. B01d 13/00
U.S. Cl. 264—41                                 25 Claims

ABSTRACT OF THE DISCLOSURE

An improved process for the production of semipermeable polybenzimidazole membrane in the form of a hollow filament which is suitable for use in reverse osmosis applications is provided. A solution of the polybenzimidazole polymer in N,N-dimethylacetamide solvent is extruded through a concentric hollow jet spinneret while continuously introducing a liquid alkane into the center portion of the extruded solution. Following coagulation, washing, and annealing (as described) a highly uniform polybenzimidazole hollow filament results which is particularly suited for use in reverse osmosis desalination procedures.

BACKGROUND OF THE INVENTION

In recent years there has been increasing interest expressed in the development of microporous membranes of a semipermeable nature which are useful in separating the components of a solution. For instance, semipermeable membranes have been looked to as possible means to demineralize or purify otherwise unusable water and to thereby alleviate the increasing demands for potable water necessitated by the rapid growth of the population and industry in many parts of the world. Separation techniques which employ such membranes include electrodialysis, reverse osmosis, ultrafiltration, etc.

Electrodialysis separations employ an electrolytic cell having alternating anionic and cationic membranes that collect desalted and concentrated solutions in adjacent compartments. Such a technique can be useful to purify liquids by removing ionizable impurities, to concentrate solutions of electrolytes, or to separate electrolytes from non-electrolytes.

As opposed to the charge dependent types of separations, reverse osmosis utilizes pressure to move materials which may be either ionic or non-ionic selectively through a membrane. Ultrafiltration, which is very similar, uses gravity or applied pressure to effect separation using membranes which act as submicronic sieves to retain large molecules and permit the passage of small, ionic, or non-ionic forms.

The desalination of salt or sea water through the use of semipermeable membranes is commonly characterized by the use of pressure in excess of osmotic pressure and is therefore termed reverse osmosis. The natural tendency for a solution of a higher concentration separated from a solution of lower concentration by a semipermeable membrane. is for the solvent on the side of lower concentration to migrate through the membrane to the solution of higher concentration thereby eventually equilibrating the concentrations of the two solutions. The degree of this natural tendency is termed osmotic pressure. The process may be reversed by applying a force to the side of higher concentration in excess of the osmotic pressure to force the pure solvent of the solution of higher concentration through the semipermeable membrane to the side of lower concentration thereby bringing about a separation. The natural tendency which is believed to be the result of a difference in free energy resulting from the concentration gradient, is observed to operate at a high thermodynamic efficiency, and at ambient temperature.

Semipermeable membranes proposed in the past have been formed from a variety of materials, and are characterized by the ability to allow one component (e.g., ions or molecules) of a solution to pass through the same to the substantial exclusion of other components (e.g., other ions or molecules). Examples of substances heretofore recognized to possess this property include cellophane (i.e., regenerated cellulose), cellulose esters (e.g., cellulose acetate, cellulose butyrate, etc.), animal or protein membranes, polyelectrolyte complexes, ethyl cellulose, crosslinked polyacrylates, etc.

The semipermeable membranes of the prior art formed from polymers other than polybenzimidazoles are of limited applicability in many separatory processes because of inherent disadvantages relating to their chemical stability, thermal stability, efficiency, length of life, and cost. Generally, such prior art membranes exhibit low thermal stability and therefore cannot be used successfully under conditions wherein the liquid undergoing treatment is at an elevated temperature. This may be a decided disadvantage in situations where the components to be separated only exist in solution at higher temperatures, or when it is economically advantageous to separate components of a solution at elevated temperatures rather than going through the expense of cooling it. Furthermore, some membranes exhibit a decided decrease in efficiency with an increase in temperature or pressure thereby limiting their range of applicability. Solvent susceptibility may be another factor affecting the applicability of a particular porous membrane to a separation process. Additionally, semipermeable membranes may be inappropriate for a particular application due to low rejection values or low flux.

Semipermeable polybenzimidazole membranes both in sheet and hollow filament form have been recognized to offer significant advantages over less stable polymeric membranes. See, for instance, commonly assigned United States Pat. No. 3,699,038, and United States Ser. Nos. 28,940, filed Apr. 15, 1970, now U.S. Pat. No. 3,720,607; 219,157, filed Jan. 19, 1972, now abandoned; and 219,576, filed Jan. 20, 1972, now U.S. Pat. No. 3,737,042. Hollow polybenzimidazole semipermeable membranes offer the capability of providing a substantially increased surface area within a relatively small separation zone. Heretofore, hollow polybenzimidazole filaments have been formed through the utilization of concentric hollow jet spinnerets whereby a fluid, i.e., either a gas such as nitrogen, or a liquid such as ethylene glycol is forced through the inner nozzle into the center portion of the extruded solution. When nitrogen is fed to the inner nozzle, the production of a hollow filament of uniform dimensions has proven to be difficult to achieve. When ethylene glycol or any other liquid miscible with the polymer solvent is fed to the inner nozzle, the production of a hollow filament exhibiting optimum flux values has proven to be an elusive goal. These liquids have been found to form an internal skin which affects the flux and rejection values of the hollow filaments ultimately formed in a detrimental manner. The internal skin also limits filament draw down preventing the formation of small diameter filaments in the absence of cracking which impairs the rejection properties of the filament.

It is an object of the present invention to provide an improved process for the production of a semipermeable polybenzimidazole membrane in the form of a hollow filament which is suitable for use in reverse osmosis applications.

It is an object of the present invention to provide an improved process for producing a highly uniform hollow polybenzimidazole filament.

It is an object of the present invention to provide an improved process for producing a hollow polybenzimidazole filament which exhibits a satisfactory combination of flux and rejection values.

It is another object of the present invention to provide an efficient and expeditious in-line process for forming a uniform hollow polybenzimidazole filament.

It is a further object of the present invention to provide an improved process for the production of a hollow polybenzimidazole filament which is particularly suited for use in a reverse osmosis desalination separation.

These and other objects, as well as the scope, nature and utilization of the process will be apparent from the following description and appended claims.

SUMMARY OF THE INVENTION

It has been found that an improved process for the production of a semipermeable polybenzimidazole membrane in the form of a hollow filament which is suitable for use in reverse osmosis applications comprises:

(a) providing a solution of about 5 to 30 percent by weight based upon the weight of the total solution of polybenzimidazole polymer in N,N-dimethylacetamide solvent, (b) extruding the solution through a concentric hollow jet spinneret while continuously introducing a liquid alkane having 8 to 15 carbon atoms into the center portion of the extruded solution, (c) coagulating the resulting solution to form a hollow filament containing the liquid alkane within the center portion thereof by contact of the exterior surface thereof with a non-solvent for the polybenzimidazole polymer which is miscible with N,N-dimethylacetamide, (d) washing the resulting hollow filament with a liquid which is miscible with N,N-dimethylacetamide and immiscible with the liquid alkane to remove residual N,N-dimethylacetamide while preserving the liquid alkane within the center portion thereof, (e) annealing the resulting hollow filament containing the liquid alkane within the center portion thereof by contact of the exterior thereof with an organic liquid at a temperature of about 120 to 260° C. which is a non-solvent for said polybenzimidazole polymer, with the organic liquid being provided at a temperature below the boiling point of the liquid alkane.

DESCRIPTION OF THE DRAWING

The drawing is a schematic presentation of an apparatus arrangement capable of carrying out the process of the present invention.

DESCRIPTION OF PREFERRED EMBODIMENTS

The Starting Polymer

The polymeric material utilized in the present process to form a semipermeable membrane in the form of a hollow filament is a linear polybenzimidazole. Typical polymers of this class and their preparation are more fully described in United States Pat. No. 2,895,948, United States Reissue Pat. No. 26,065, and in the Journal of Polymer Science, Vol. 50, pages 511–539 (1961) which are herein incorporated by reference. The polybenzimidazoles consist essentially of recurring units of the following Formulas I and II.

Formula I is:

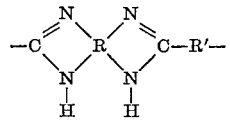

wherein R is a tetravalent aromatic nucleus, preferably symmetrically substituted, with the nitrogen atoms forming the benzimidazole rings being paired upon adjacent carbon atoms, i.e., ortho carbon atoms, of the aromatic nucleus, and R' is a member of the class consisting of (1) an aromatic ring, (2) an alkylene group (preferably those having 4 to 8 carbon atoms), and (3) a heterocyclic ring from the class consisting of (a) pyridine, (b) pyrazine, (c) furan, (d) quinoline, (e) thiophene, and (f) pyran.

Formula II is:

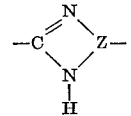

wherein Z is an aromatic nucleus having the nitrogen atoms forming the benzimidazole ring paired upon adjacent carbon atoms of the aromatic nucleus.

Preferably, aromatic polybenzimidazoles are selected, e.g., from polymers consisting essentially of the recurring units of Formulas I and II wherein R' is an aromatic ring or a heterocyclic ring.

As set forth in United States Reissue Pat. No. 26,065, the aromatic polybenzimidazoles having the recurring units of Formula II may be prepared by self-condensing a trifunctional aromatic compound containing only a single set of ortho disposed diamino substituents and an aromatic, preferably phenyl, carboxylate ester substituent. Exemplary of polymers of this type is poly-2,5(6)-benzimidazole prepared by the autocondensation of phenyl-3,4-diaminobenzoate.

As also set forth in the above-mentioned patent, the aromatic polybenzimidazoles having the recurring units of Formula I may be prepared by condensing an aromatic tetraamine compound containing a pair of orthodiamino substituents on the aromatic nucleus with a dicarboxyl compound selected from the class consisting of (a) the diphenyl ester of an aromatic dicarboxylic acid, (b) the diphenyl ester of a heterocyclic dicarboxylic acid wherein the carboxyl groups are substituents upon carbon in a ring compound selected from the class consisting of pyridine, pyrazine, furan, quinoline, thiophene, and pyran and (c) an anhydride of an aromatic dicarboxylic acid.

Examples of polybenzimidazoles which have the recurring structure of Formula I are as follows:

poly-2,2'-(m-phenylene)-5,5'-bibenzimidazole;
poly-2,2'-(pyridylene-3'',5'')-5,5'-bibenzimidazole;
poly-2,2'-(furylene-2'',5'')-5,5'-bibenzimidazole;
poly-2,2'-(naphthalene-1'',6'')-5,5'-bibenzimidazole;
poly-2,2'-(biphenylene-4'',4''')-5,5'-bibenzimidazole;
poly-2,2'-amylene-5,5'-bibenzimidazole;
poly-2,2'-octamethylene-5,5'-bibenzimidazole;
poly-2,6-(m-phenylene)-diimidazobenzene;
poly-2,2'-cyclohexeneyl-5,5'-bibenzimidazole;
poly-2,2'-(m-phenylene)-5,5'-di(benzimidazole)ether;
poly-2,2'-(m-phenylene)-5,5'-di(benzimidazole) sulfide;
poly-2,2'-(m-phenylene)-5,5'-di(benzimidazole) sulfone;
poly-2,2'-(m-phenylene)-5,5'-di(benzimidazole) methane;
poly-2',2''-(m-phenylene)-5',5''-di(benzimidazole) propane-2,2; and
poly-2,2'-(m-phenylene)-5',5'''-di(benzimidazole) ethylene-1,2 where the double bonds of the ethylene groups are intact in the final polymer.

The preferred polybenzimidazole for use in the present process is one prepared from poly-2,2'-(m-phenylene)-5,5'-bibenzimidazole, the recurring unit of which is:

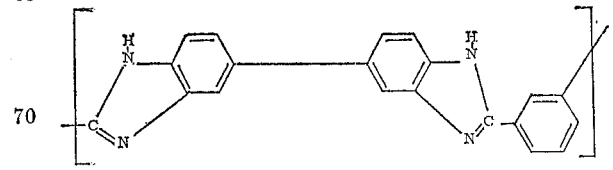

Any polymerization process known to those skilled in the art may be employed to prepare the polybenzimidazole which is utilized to form semipermeable membranes in accordance with the present invention. Representative techniques for preparing the polybenzimidazole are disclosed in United States Pat. Nos. 3,509,108; 3,549,603; and 3,551,389, which are assigned to the assignee of the present invention and are herein incorporated by reference.

With respect to aromatic polybenzimidazoles, preferably, equimolar quantities of the monomeric tetraamine and dicarboxyl compound may be introduced into a first stage melt polymerization reaction zone and heated therein at a temperature above about 200° C., preferably at least 250° C., and more preferably from about 270 to 300° C. The reaction is conducted in a substantially oxygen-free atmosphere, i.e., below about 20 p.p.m. oxygen and preferably below about 8 p.p.m. oxygen, until a foamed prepolymer is formed. Usually, the first stage reaction is continued until a prepolymer is formed having an inherent viscosity, expressed as deciliters per gram, of at least 0.1, and preferably from about 0.13 to 0.3 (determined from a solution of 0.4 grams of the polymer in 100 ml. of 97 percent $H_2SO_4$ at 25° C.).

After the conclusion of the first stage reaction, which normally takes at least 0.5 hour, and preferably 1 to 3 hours, the foamed prepolymer is cooled and then powdered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.4, e.g., 0.8 to 1.1 or more.

The temperature employed in the second stage is at least 250° C., preferably at least 325° C., and more preferably from about 350 to 425° C. The second stage reaction generally takes at least 0.5 hour, and preferably from about 1 to 4 hours or more.

The Polymer Solution

The solvent utilized to form the polybenzimidazole polymer spinning solution is N,N-dimethylacetamide. The polybenzimidazole polymer is provided in the spinning solution in a concentration of about 5 to 30 percent by weight based upon the weight of the total solution, and most preferably in a concentration of 22 to 26 percent by weight based upon the weight of the total solution.

The spinning solution preferably also contains lithium chloride in a concentration of about 0.1 to 5 percent by weight, and most preferably in a concentration of about 1 to 4 percent by weight. The lithium chloride serves the function of preventing the polybenzimidazole polymer from phasing out of the solution upon standing for extended peroids of time.

A preferred spinning solution comprises about 22 to 26 perecnt by weight polybenzimidazole polymer, about 1 to 4 percent lithium chloride, and about 70 to 77 percent by weight N,N-dimethylacetamide.

The spinning solution preferably exhibits a viscosity of about 40 to 4000 poises measured at 30° C., and most preferably a viscosity of about 1200 to 2500 poises measured at 30° C.

One suitable means for dissolving the polymer in the solvent is by mixing the materials at a temperature above the normal boiling point of the solvent for example, about 25 to 120° C. above such boiling point, and at a pressure of 2 to 15 atmospheres for a period of 1 to 5 hours. The resulting solutions then preferably are filtered to remove any undissolved polymer.

Formation of Hollow Polybenzimidazole Filament

The poybenzimidazole polymer solution is preferably provided at a temperature of about 15 to 50° C. at the time of extrusion, and most preferably at about room temperature (i.e., about 25° C.).

The solution is extruded through a concentric hollow jet spinneret sometimes referred to in the art as a sheath-core spinneret. An inner nozzle is provided and a concentric nozzle is arranged about the inner nozzle. The dimensions of the spinneret are preferably such that the outer diameter of the resulting extrusion orifice through which the polymer solution passes is about 0.02 to 0.1 inch, and most preferably about 0.03 to 0.07 inch. The inner diameter of the extrusion orifice through which the polymer solution passes is preferably about 0.005 to to 0.05 inch less than that of the outer diameter, and most preferably about 0.005 to 0.03 inch less than that of the outer diameter. Commercially available concentric hollow jet spinnerets such as those commonly utilized in the formation of high bulk fibers, thermal insulation, or sound insulation may be selected for use in the present process. The spinneret selected may include one or a plurality of appropriate extrusion orifices. A bomb or other container for the spinning solution is placed in communication with the spinneret and sufficient pressure is applied to the solution to force the spinning solution through the spinneret.

During the extrusion operation a liquid alkane having 8 to 15 carbon atoms per molecule is continuously introduced through the spinneret into the central portion of the extruded solution. The liquid alkane is a saturated aliphatic hydrocarbon of the formula $C_nH_{2n+2}$ where $n$ equals 8 to 15. In a particularly preferred embodiment of the process the liquid alkane is a straight chain alkane having 12 to 13 carbon atoms per molecule, i.e., dodecane or tridecane, or mixtures thereof. The liquid alkane is preferably at a temperature of about 15 to 50° C. at the time of extrusion, and most preferably at about room temperature (i.e., about 25° C.). The liquid alkane is immiscible with the spinning solution and the coagulation bath (discussed hereafter) and accordingly does not promote the coagulation of the spinning solution which surrounds the same upon extrusion.

The polybenzimidazole polymer solution and the liquid alkane preferably are caused to issue from the spinneret at a rate of about 0.2 to 20 meters per minute, and most preferably at a rate of 0.2 to 5 meters per minute.

The extruded solution is coagulated to form a hollow filament containing the liquid alkane within the center portion thereof by contact of the exterior surface thereof with a non-solvent for the polybenzimidazole polymer which is miscible with N,N-dimethylacetamide (e.g., by immersion in a coagulation bath). Preferred non-solvents for the polybenzimidazole polymer for bringing about coagulation are water, ethylene glycol, mixtures of water and ethylene glycol, and mixtures of water and N,N-dimethylacetamide. Other representative non-solvents for the polybenzimidazole polymer in which coagulation may be carried out include glycerine, methanol, isopropanol, etc. In a particularly preferred embodiment of the process coagulation is carried out by contact with a liquid of about 90 to 100 percent water by weight and about 0 to 10 percent N,N-dimethylacetamide by weight. Typical coagulation bath lengths are about 0.25 to 5 meters in length, and preferably about 0.5 to 2.5 meters in length.

The solution containing the liquid alkane within the center portion thereof is preferably extruded into a gaseous atmosphere (e.g., air at about room temperature) prior to contact of the exterior surface thereof with the coagulation liquid. Dry jet wet spinning may be utilized wherein the spinneret is positioned in a spaced relationship to a coagulation liquid. For instance, the spinneret may be conveniently positioned about 1 to 2 inches above the coagulation liquid in a particularly preferred embodiment of the process. Such positioning of the spinneret in a spaced relationship to a coagulation liquid facilities the implementation of a substantial draw down, as discussed hereafter, which takes place to a large degree while the extruded solution is present in the gaseous atmosphere immediately prior to coagulation. Alternatively, the spinning solution containing the liquid alkane within the center portion thereof may be extruded so that its exterior surface immediately contacts the coagulation liquid upon passage through the concentric hollow jet spinneret.

The exposure of the solution containing the liquid alkane within the center portion thereof to the coagulation liquid is preferably at least about 0.5 second, and most preferably about 1 to 5 seconds. Longer coagulation residence times than 10 seconds may be utilized without a commensurate advantage. The coagulation liquid is preferably provided at a temperature of about 15 to 40° C., and most preferably at a temperature of about 25° C. when contacted with the extruded solution.

A longitudinal tension may be exerted upon the hollow filament containing the liquid alkane within the center portion thereof as it is withdrawn from the coagulation zone. A tension is preferably applied to the resulting hollow filament so that it is withdrawn from the coagulation bath at a speed about 2 to 10 times greater than that at which the polymer solution is caused to issue from the spinneret, i.e., at a draw down ratio of about 2 to 10/1. In a preferred embodiment of the process the coagulated hollow filament accordingly is withdrawn from the coagulation bath at a rate of about 10 to 100 meters per minute, and most preferably at a rate of 15 to 50 meters per minute. When a dry jet wet spinning technique is utilized, the elongation takes place almost entirely while present in the gaseous atmosphere and prior to contact with the coagulation bath. The drawing operation decreases the diameter of the hollow filament and increases its surface area per unit volume.

The resulting coagulated hollow filament is next washed with a liquid which is miscible with N,N-dimethylacetamide and immiscible with the liquid alkane to remove residual N,N-dimethylacetamide while preserving the liquid alkane within the center portion thereof. Preferred wash solutions include water, ethylene glycol, and mixtures of water and ethylene glycol. Other representative wash solutions include glycerin, methanol, ethanol, isopropanol, etc. The hollow filament is preferably continuously passed through a wash bath while suspended therein. For instance, conventional fiber wash rolls may be employed. The wash liquid is preferably provided at a temperature of about 5 to 30° C., and most preferably at a temperature of about 15 to 25° C. Wash times of about 10 to 60 seconds, or longer may be utilized. The hollow filament is preferably washed until its N,N-dimethylacetamide content is below about 10 percent by weight excluding the weight of the liquid alkane, and most preferably below about 5 percent by weight.

The resulting hollow filament containing the liquid alkane within the center portion thereof, following washing, is annealed by contact of its exterior surface with an organic liquid at a temperature of about 120 to 260° C. which is a non-solvent for the polybenzimidazole polymer with the organic liquid being provided at a temperature below the boiling point of the liquid alkane. The organic liquid is water-miscible and immiscible with the liquid alkane. The organic liquid is most preferably provided at a temperature of about 160 to 170° C. during annealing when employing a liquid alkane having a boiling point in excess of such temperature. The annealing step is preferably carried out at atmospheric pressure. However, the annealing step alternatively may be carried out under superatmospheric pressure conditions.

A preferred class of organic liquids is the polyhydroxy alcohols having 2 to 3 hydroxy groups and 2 to 6 carbon atoms. Representative polyhydroxy aliphatic alcohols of use in the present process include glycols such as ethylene glycol [1,2-ethanediol], propylene glycol [1,2-propanediol], trimethylene glycol [1,3-propanediol], alpha-butylene glycol [1,2-butanediol], beta-butylene glycol [1,3-butanediol], tetramethylene glycol [1,4-butanediol], sym-dimethylethylene glycol [2,3-butanediol], diethylene glycol [2,2'-oxydiethanol], triethylene glycol [2,2'-(ethylenedioxy) diethanol], and hexamethylene glycol [1,6-hexanediol]. Other polyhydroxy aliphatic alcohols such as glycerol [1,2,3-propanetriol] may likewise be selected. The particularly preferred polyhydroxy aliphatic alcohols are ethylene glycol and glycerol. Mono- and dialkyl ethers of ethylene glycol marketed under the trademark Cellosolve may be selected.

Contact between the washed hollow polybenzimidazole filament and organic liquid is preferably accomplished by immersion. Such contact alternatively may be carried out by spraying or other similar techniques as will be apparent to those skilled in the art. It is recommended that the hollow polybenzimidazole filament be annealed while simultaneously applying a longitudinal tension thereto whereby the filament is elongated about 1 to 10 percent in length. Such elongation during annealing may be conveniently carried out while undergoing continuous processing and has been found to enhance the reverse osmosis characteristics of the resulting hollow filaments.

The period of time during which the annealing step is conducted varies with the temperature of the organic liquid. Annealing times commonly range from about 1 to 300 seconds, and preferably range from about 2 to 60 seconds. Considerably longer residence times for the annealing step show no beneficial results.

Subsequent to the annealing step the alkane present within the central portion of the hollow filament may be removed by any convenient technique such as by cutting the same and thereafter immersing the same in water. The resulting hollow filament may be stored for extended periods of time while immersed in water.

The present process offers advantages over the prior art since it is capable of efficiently producing highly uniform hollow polybenzimidazole filaments. Pulsing of the extruded filament which commonly results when employing a gas center feed is eliminated. Also, the alkane center feed offers significant advantages over other center feeds employed in the prior art such as ethylene glycol. Instantaneous coagulation of the inner portion of the hollow filament is avoided upon extrusion, and a polybenzimidazole filament exhibiting improved reverse osmosis characteristics results, i.e., a combination of high rejection and enhanced flux. Also, the alkane center feed makes possible significant drawing of the as-spun filament prior to washing, thereby increasing the surface area of the same per unit volume.

The resulting hollow polybenzimidazole filaments have an outer surface which is relatively dense adjacent a more porous internal structure. The hollow filaments are characterized by high thermal stability and can withstand temperatures during use in excess of 125° C. Also, the hollow filaments exhibit a high degree of chemical stability, and can continue to function in spite of contact with a wide variety of solvents.

The hollow polybenzimidazole filaments produced in the present process commonly have an outer diameter of about 100 to 300 microns, and an inner diameter of about 20 to 160 microns. The particularly preferred hollow polybenzimidazole filaments produced in the present process have an outer diameter of about 180 to 300 microns and a wall thickness of about 40 to 90 microns.

During the preparation of the hollow polybenzimidazole filaments, as hereafter described, it is important to recognize that the optimum reverse osmosis separatory devices are prepared from a plurality of substantially parallel hollow filaments which exhibit the minimum possible diameter, for as the diameter of the hollow filaments decreases the surface area subject to the reverse osmosis processes necessarily is increased, and with it the rate of reverse osmosis. It is further desirable to have the maximum possible inside diameter in order to increase the inside surface area of reverse osmosis hollow filament membranes, and to reduce pressure drop along the filament length. Bundles of hollow filaments containing the desired number of fibers are prepared by applying an adhesive to each end of the group of prearranged parallel hollow filaments. The bundled filaments are then preferably inserted into an elongated fluid-tight tubular casing assembly formed of a suitable material such as steel. Each end of the bundled filaments communicates to the outside of the casing while at either end of the casing a means for sealing each end of the filament bundle to the ends of the casing is provided. The tubular casing is further provided with valves which open into the interior of the casing and to the outer surface of each of the filaments in the bundle, so as to provide a means for circulating the liquid to be purified about the hollow fibers. Although the filament bundle should be packed as tightly as possible, it should be packed loosely enough to allow a liquid to pass between the individual filaments and effectively surround each hollow filament. Rather than utilizing a dual-ended tubular casing in which both ends are open to allow the escape of collected fluids, it is possible to utilize a permeator in which hollow filament bundles have been formed into a loop so that the ends of each of the filaments both exit through the same opening in the tubular casing. It is also, of course, possible to operate bundles of hollow fibers as reverse osmosis membranes when one end of the bundle has been blocked off.

In actual operation, salt water or other desired liquid is pumped into the casing to surround the exterior walls of the fibers in the bundle. (Pressure can range from slightly above ambient to about 5000 p.s.i., preferably 600 to 3000 p.s.i.) In the case of salt water substantially (as high as 99 percent or higher) salt free water (depending, of course, on the feed concentration) accumulates on the inside of the fibers and flows in either direction along the hollow filaments to the exit. Using the above procedure it is possible to prepare as much as two to twenty-five gallons of water or more per square foot of hollow filaments outside surface area per day at pressures up to 5000 p.s.i.

The hollow filaments as prepared in the present process can be assembled for use in a water purification or permeator as described in U.S. Pat. 3,339,341, and as further described in U.S. Pat. 3,567,632.

Generally, these permeators comprise in combination a fluid-tight casing assembled about a plurality of substantially parallel hollow filaments. The casing is provided with an inlet means for directing feed fluid (the fluid upon which the reverse osmosis operation is to act upon) over that portion of the exterior surface of the hollow filaments exposed in the interior of the casing. The casing is also provided with an exit means for selecting and removing a fluid which has been subject to the reverse osmosis process (in the case of salt water, desalinized water). Of course, the feed fluid may also be directed into the interior of said hollow filaments in which case the fluid which has been subject to reverse osmosis is removed from the exterior surface of said hollow filaments.

The following examples are given as specific illustrations of the invention. It should be understood, however, that the invention is not limited to the specific details set forth in the examples. Reference is made in the examples to the drawing.

Example I

A polybenzimidazole polymer spinning solution having a viscosity of 1800 poises at 30° C. was prepared employing N,N - dimethylacetamide solvent. The spinning solution contained 24 parts by weight poly-2,2'(m-phenylene)-5,5'-bibenzimidazole, 24 parts by weight lithium chloride, and 74 parts by weight N,N-dimethylacetamide. The dissolution of the polymer was accomplished by agitating the same while in particulate form with the N,N-dimethylacetamide solvent (in which the lithium chloride was previously dissolved) while in a closed vessel at a temperature of about 230° C.

The spinning solution was provided in spinning bomb 1 while at room temperature (i.e., about 25° C.), was fed via line 2 to candle filter 4, and was fed via line 6 to a five hole concentric hollow jet spinneret 8. The spinneret 8 was of the standard sheath core type and was commercially available from the Engelhard Minerals and Chemicals Corporation. The outer diameter of each extrusion orifice through which the spinning solution was supplied was 0.055 inch, and the inner diameter of each extrusion orifice through which the spinning solution was supplied was 0.03 inch. The spinning solution was extruded at a rate of 0.879 cc./min. per extrusion orifice, or at a rate of about 2 meters per minute.

Liquid dodecane was fed to the central portion of each orifice of spinneret 8 from storage tank 10 via line 12. The central portion of each orifice of spinneret 8 had a diameter of 0.0125 inch, and the liquid alkane was extruded through the central portion of each orifice at a rate of 0.11 cc./min. The liquid dodecane was at room temperature (i.e., at about 25° C.) when extruded.

A circulating water coagulation bath 14 was provided in vessel 16 having a length of 33 inches. The coagulation bath was at approximately 20 to 25° C. and water was continuously added and withdrawn so that substantially pure water was always present in the same during the spinning. Guides 18 and 20 were provided below the surface of the coagulation bath 14.

The face of spinneret 8 was mounted 2 inches above the surface of coagulation bath 14 so that each stream of the extruded spinning solution 22 containing dodecane within the central portion thereof briefly passed through room temperature air (i.e., at about 25° C.) prior to reaching coagulation bath 14.

The resulting coagulated hollow filaments 24 containing dodecane within the central portion of each were taken up on wash rolls 26 and 28 at a rate of 18 meters per minute. The filaments were accordingly drawn about nine times their original length prior to washing, i.e., were taken up on roll 26 at a draw down or spin ratio of about 9/1. A substantial portion of this drawing occurred prior to the point where the extruded solution 22 contacted coagulation bath 14.

Ethylene glycol 30 while at about 20° C. was provided in wash vessel 32. While passing around rolls 26 and 28 in a plurality of wraps, the resulting filaments were immersed in the ethylene glycol 30 for about 25 seconds where the residual N,N-dimethylacetamide was substantially all removed. The resulting filaments following washing contained less than about 5 percent N,N-dimethylacetamide by weight excluding the weight of the dodecane present therein.

The washed filaments containing liquid dodecane present therein were next continuously passed through ethylene glycol annealing liquid 34 present in vessel 36. The ethylene glycol annealing liquid 34 was maintained at a temperature of 160° C. and the filaments were immersed therein for a residence time of about 6 seconds. The annealing liquid 34 was provided in vessel 36 to a depth of 50 inches and the movement of the filaments therethrough was directed by roller guides 38, 40, and 42. While passing through ethylene glycol annealing liquid 34 a longitudinal tension was exerted upon the filaments so as to elongate the same about 8 percent and the filaments were taken up on rotating takeup bobbin 44 at a rate of 19.5 meters per minute with the aid of traverse 46. The rotating takeup bobbin 44 was partially immersed in water 18 present in vessel 50 so that the surface of the filaments was always provided with at least a coating of water.

The resulting hollow polybenzimidazole filaments possessed a highly uniform configuration and possessed an outer diameter of about 220 microns and an inner diameter of about 82 microns. The liquid alkane was removed from the center portion of each filament by cutting the filaments, forming a U-shaped fiber length with the cut ends up, and completely immersing the fiber lengths in water. The filaments were next prepared for a reverse osmosis separation as described in Example VI of commonly assigned United States Ser. No. 219,576, filed Jan. 20, 1972 of Abraham A. Boom. Reverse osmosis desalination separation were carried out as described in said Example VI employing test pressures of 400 p.s.i. and 600 p.s.i.

The superiority of hollow polybenzimidazole filaments during desalination is demonstrated by the data presented below.

Flux refers to the amount of water passing through the filament wall per unit area per unit time and is generally expressed in gallons/ft.²/day.

The rejection is a relative measure of the ability of the membrane to retard the passage of sodium chloride expressed as a weight percentage of the total.

| Sample number | 400 p.s.i. test pressure | | 600 p.s.i. test pressure | |
|---|---|---|---|---|
| | Flux (GFD) | Rejection (percent) | Flux (GFD) | Rejection (percent) |
| 1 | 2.57 | 96.1 | 3.12 | 98.1 |
| 2 | 2.16 | 96.4 | 2.89 | 98.1 |
| 3 | 2.17 | 97.7 | 2.99 | 98.8 |
| Average 1-3 | 2.30 | 96.7 | 3.00 | 98.4 |

Although the invention has been described with preferred embodiments, it is to be understood that variations and modifications may be resorted to as will be apparent to those skilled in the art. Such variations and modifications are to be considered within the purview and scope of the claims appended hereto.

I claim:

1. A process for the production of a semipermeable polybenzimidazole membrane in the form of a hollow filament which is suitable for use in reverse osmosis applications comprising:
   (a) providing a solution of about 5 to 30 percent by weight based upon the weight of the total solution of polybenzimidazole polymer in N,N-dimethylacetamide solvent,
   (b) extruding said solution through a concentric hollow jet spinneret while continuously introducing a liquid alkane having 8 to 15 carbon atoms into the center portion of said extruded solution, said liquid alkane being immiscible with said extruded solution,
   (c) coagulating said resulting solution to form a hollow filament containing said liquid alkane within the center portion thereof by contact of the exterior surface thereof with a non-solvent for said polybenzimidazole polymer which is miscible with N,N-dimethylacetamide and immiscible with said liquid alkane,
   (d) washing said resulting hollow filament with a liquid which is miscible with N,N-dimethylacetamide and immiscible with said liquid alkane to remove residual N,N-dimethylacetamide while preserving said liquid alkane within the center portion thereof, and
   (e) annealing said resulting hollow filament containing said liquid alkane within the center portion thereof by contact of the exterior thereof with an organic liquid at a temperature of about 120 to 260° C. which is a non-solvent for said polybenzimidazole polymer, with said organic liquid being provided at a temperature below the boiling point of said liquid alkane.

2. A process according to Claim 1 wherein said polybenzimidazole polymer consists essentially of recurring units of the formula:

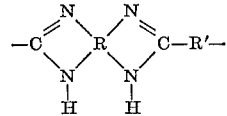

wherein R is a tetravalent aromatic nucleus, with the nitrogen atoms forming the benzimidazole rings paired upon adjacent carbon atoms of said aromatic nucleus, and R' is selected from the group consisting of (1) an aromatic ring, (2) an alkylene group having from 4 to 8 carbon atoms, and (3) a heterocyclic ring selected from the group consisting of (a) pyridine, (b) pyrazine, (c) furan, (d) quinoline, (e) thiophene, and (f) pyran.

3. A process according to Claim 1 wherein said polybenzimidazole polymer is poly-2,2'-(m-phenylene)-5,5'-bibenzimidazole.

4. A process according to Claim 1 wherein said solution of said polybenzimidazole prior to extrusion includes about 0.1 to 5 percent lithium chloride based upon the total weight of the solution.

5. A process according to Claim 1 wherein said polybenzimidazole is present in said solution prior to extrusion in a concentration of about 22 to 26 percent by weight based upon the total weight of the solution.

6. A process according to Claim 1 wherein said solution of said polybenzimidazole prior to extrusion has a viscosity of about 1200 to 2500 poises measured at 30° C.

7. A process according to Claim 1 wherein liquid alkane is a straight chain alkane having 12 to 13 carbon atoms per molecule.

8. A process according to Claim 1 wherein said solution of said polybenzimidazole is initially extruded into a gaseous atmosphere prior to said coagulation upon contact of the exterior thereof with a non-solvent for said polymer.

9. A process according to Claim 1 wherein said non-solvent for said polybenzimidazole polymer in which coagulation takes place is 90 to 100 percent water by weight and 0 to 10 percent N,N-dimethylacetamide by weight.

10. A process according to claim 1 wherein said process steps are conducted continuously and said hollow filament is elongated about 2 to 10 times its original length prior to said washing through the application of longitudinal tension.

11. A process according to Claim 1 wherein said washing is carried out in ethylene glycol.

12. A process according to Claim 11 wherein said ethylene glycol is present at a temperature of about 5 to 30° C.

13. A process according to Claim 1 wherein said annealing step is conducted for about 1 to 300 seconds.

14. A process according to Claim 1 wherein said organic liquid which is contacted with the exterior of said hollow filament during said annealing is a polyhydroxy aliphatic alcohol having 2 to 3 hydroxy groups and 2 to 6 carbon atoms.

15. A process according to Claim 1 wherein said organic liquid which is contacted with the exterior of said hollow filament during said annealing is ethylene glycol.

16. A process according to Claim 1 wherein said organic liquid which is contacted with the exterior of said hollow filament during said annealing is glycerol.

17. A process according to Claim 1 wherein said organic liquid which is contacted with the exterior of said hollow filament during said annealing is at a temperature of about 120 to 175° C.

18. A process according to Claim 1 wherein said annealing step is conducted with the simultaneous application of a longitudinal tension wherein said hollow filament is elongated about 1 to 10 percent.

19. A process for the production of a semipermeable polybenzimidazole membrane in the form of a hollow filament suitable for use in reverse osmosis applications comprising:
   (a) providing a solution of about 22 to 26 percent by weight polybenzimidazole polymer, about 1 to 4 percent by weight lithium chloride, and about 70 to 77 percent N,N-dimethylacetamide, with said solution having a viscosity of about 1200 to 2500 poises measured at 30° C.,
   (b) extruding said solution through a concentric hollow jet spinneret into a gaseous atmosphere while continuously introducing a liquid straight chain alkane having 12 to 13 carbon atoms per molecule into the center portion of said solution, (c) coagulating said resulting solution to form a hollow filament containing said liquid alkane within the center portion thereof by contact of the exterior surface thereof with 90 to 100 percent water by weight and 0 to 10 percent N,N-dimethylacetamide by weight, (d) washing said resulting hollow filament while preserving said liquid straight chain alkane within the center portion thereof by contact of the exterior thereof with ethylene glycol at a temperature of about 5 to 30° C. to remove residual N,N-dimethylacetamide, and (e) annealing said resulting hollow filament by contact of the exterior thereof with ethylene glycol at a temperature of about 120 to 175° C.

20. A process according to Claim 19 wherein said polybenzimidazole polymer consists essentially of recurring units of the formula:

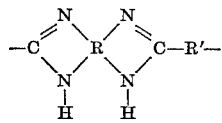

wherein R is a tetravalent aromatic nucleus, with the nitrogen atoms forming the benzimidazole rings paired upon adjacent carbon atoms of said aromatic nucleus, and R' is selected from the group consisting of (1) an aromatic ring, (2) an alkylene group having from 4 to 8 carbon atoms, and (3) a heterocyclic ring selected from the group consisting of (a) pyridine, (b) pyrazine, (c) furan, (d) quinoline, (e) thiophene, and (f) pyran.

21. A process according to Claim 19 wherein said polybenzimidazole polymer is poly-2,2'-(m-phenylene)-5,5'-bibenzimidazole.

22. A process according to Claim 19 wherein said coagulation is carried out by contact with substantially pure water.

23. A process according to Claim 19 wherein said steps are conducted continuously and said hollow filament elongated about 2 to 10 times its original length prior to said washing through the application of longitudinal tension.

24. A process according to Claim 19 wherein said annealing is carried out by contact with ethylene glycol at about 160–170° C.

25. A process according to Claim 19 wherein said annealing step is conducted with the simultaneous application of a longitudinal tension wherein said hollow filament is elongated about 1 to 10 percent.

References Cited
UNITED STATES PATENTS

| | | | |
|---|---|---|---|
| Re. 26,065 | 7/1966 | Marvel et al. | 260—47 CP |
| 2,895,948 | 7/1959 | Brinker et al. | 260—78.4 R |
| 3,339,341 | 9/1967 | Maxwell et al. | 55—16 |
| 3,412,184 | 11/1968 | Sharples et al. | 264—41 |
| 3,423,491 | 1/1969 | McLain et al. | 264—209 |
| 3,567,632 | 3/1971 | Richter et al. | 210—500 |
| 3,658,955 | 4/1972 | Chamberlin et al. | 210—500 |
| 3,699,038 | 10/1972 | Boom | 264—216 |
| 3,710,945 | 1/1973 | Dismore | 210—500 |
| 3,720,607 | 3/1973 | Brinegar | 210—500 |
| 3,737,042 | 6/1973 | Boom | 210—321 |

RONALD W. GRIFFIN, Primary Examiner

U.S. Cl. X.R.

210—500; 260—2.5 N; 264—209